May 14, 1968     J. SCHWEIGER     3,382,532
APPARATUS FOR BLOW-MOLDING OF HOLLOW PLASTIC ARTICLES
Filed May 10, 1965

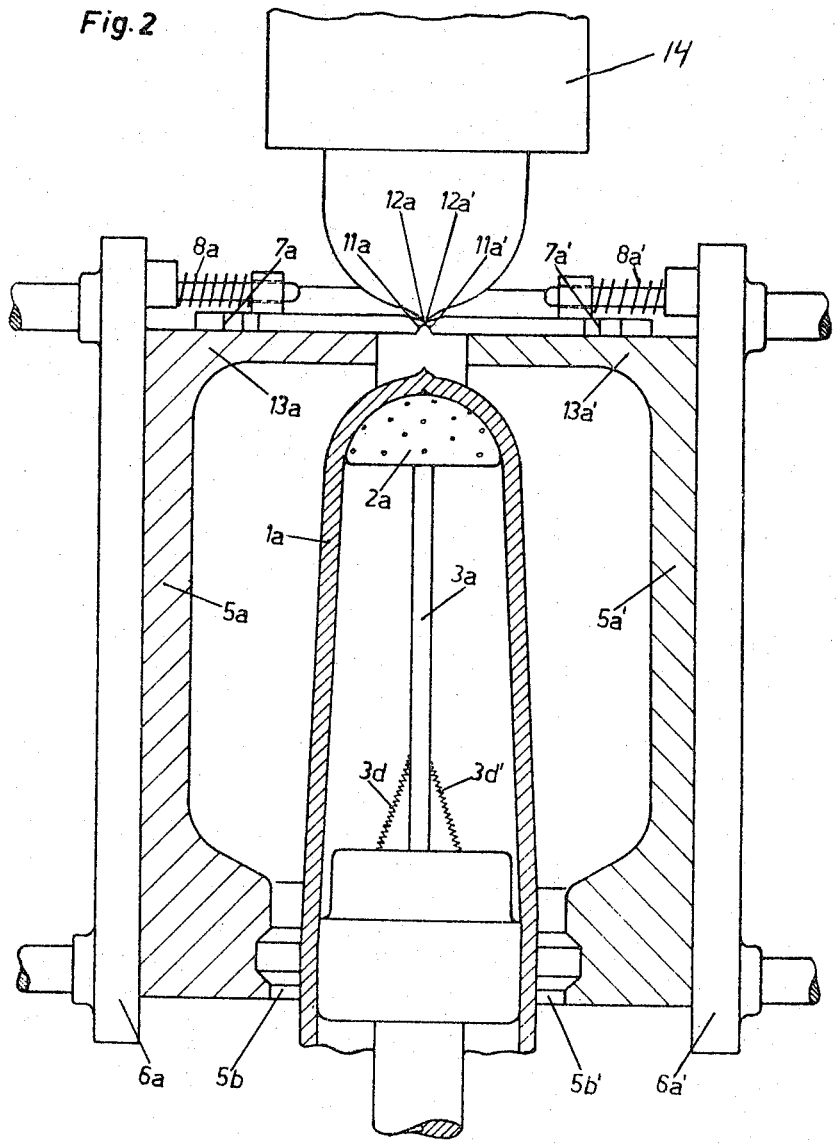

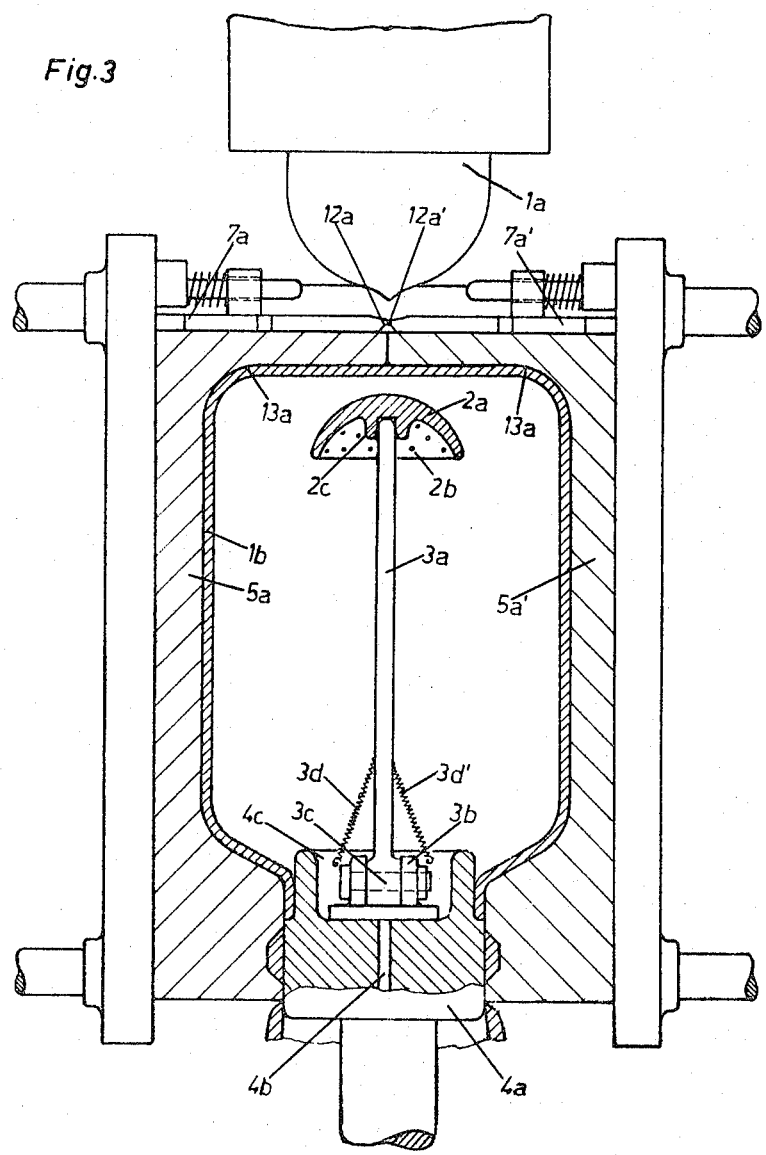

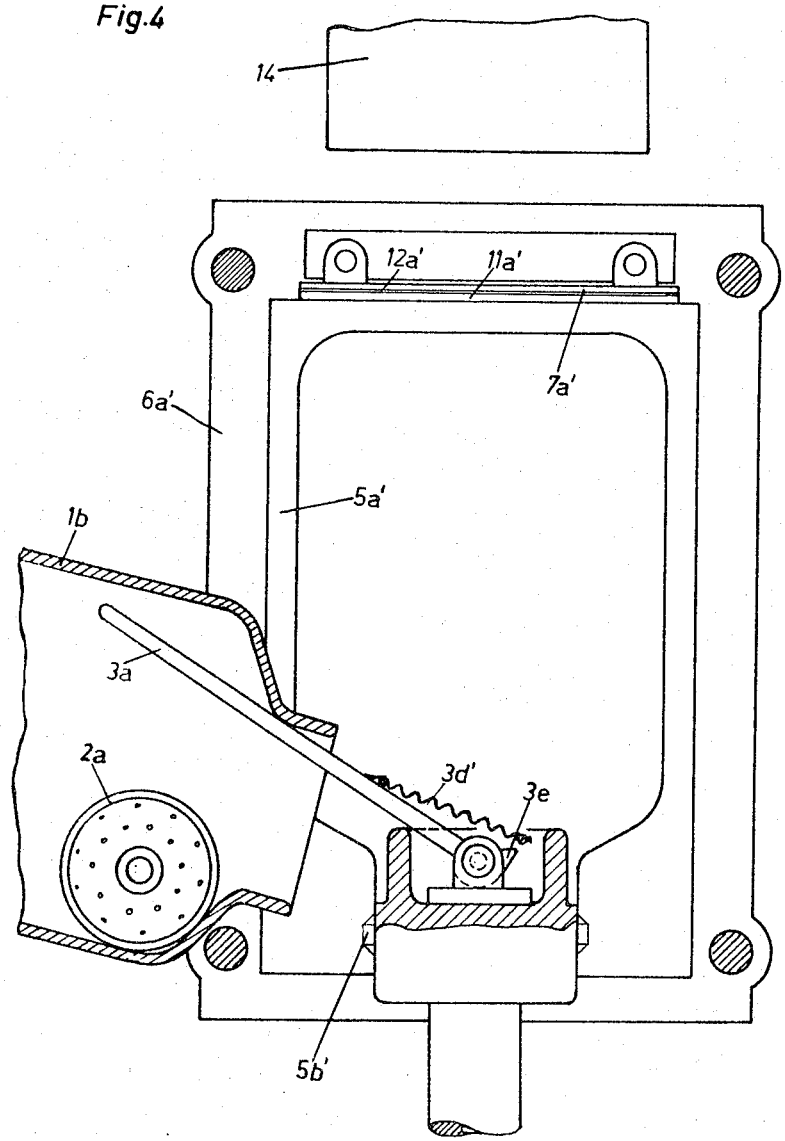

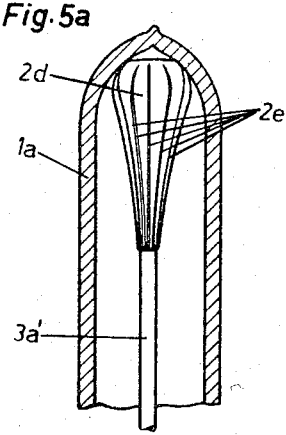
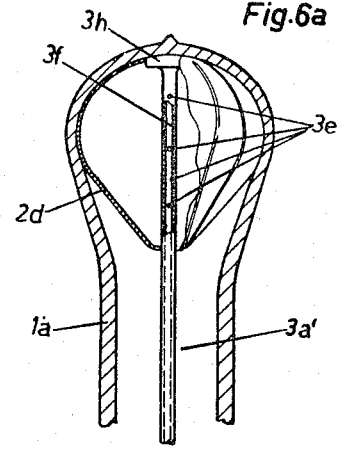
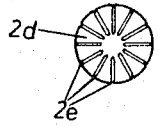
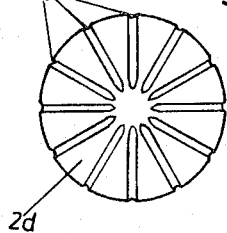

United States Patent Office 3,382,532
Patented May 14, 1968

3,382,532
APPARATUS FOR BLOW-MOLDING OF HOLLOW PLASTIC ARTICLES
Josef Schweiger, Kalsdorf, Styria, Austria, assignor to Shell Oil Company, New York, N.Y., a corporation of Delaware
Filed May 10, 1965, Ser. No. 454,381
9 Claims. (Cl. 18—5)

ABSTRACT OF THE DISCLOSURE

An apparatus for the production of hollow blown plastic articles having a uniform bottom wall thickness comprising (1) a plastic tube supplying means, (2) a partable blow mold, (3) a cutting and heat-sealing means for said tube, (4) a blowing mandrel for inflating the sealed tube within said mold and (5) a supporting member for said sealed tube during inflation thereof.

---

The invention relates to an apparatus for the manufacture of hollow articles by inflating a tube of plastic material in a blow mold.

The known method of the above type in which the tube is pinched by pinching edges of the mold and during the inflation of the tube the pinched end is held and restrained from expansion by the pinching edges of the mold produces hollow articles, for example containers, having a wall thickness in the bottom corners farthest away from the mold parting or pinching line which is considerably less than in regions of the bottom near the pinching line. It is therefore the object of the invention to provide an apparatus for the manufacture of blow molded plastic articles which have a uniform bottom wall thickness.

The operation of the instant apparatus according to the invention is characterized in that the tube is first pinched and cut off at one end above the mold and subsequently passes into the open blow mold in a downward axial direction until the pinched end of the tube is positioned a short distance below the upper edge of the mold, in which position the tube is supported within the mold at the pinched end portion and at the inside thereof. The tube can be supported in the mold by a supporting member mounted on the blowing mandrel.

When hollow blown articles with a large diameter are to be made, the supporting member may be formed as a mechanically or pneumatically expansible supporting member to provide a large supporting area when it is necessary to support the tube but which thereafter may be made small enough to be withdrawn easily out of the opening of the article.

The invention enables tubes having a relatively small diameter to be inflated very uniformly to very thin-walled articles of any desired size, and the invention is of particular interest for the production of large containers.

The apparatus of the invention will now be elucidated with reference to the drawing, in which:

FIGURE 2 shows the sections of the blow mold in a partly closed position, with the severed portion of the tube being supported by the supporting member inside the mold;

FIGURE 3 shows the tube lifted from the supporting member, inflated and formed into a hollow article against the walls;

FIGURE 4 is a side view showing how the hollow article is removed from the supporting member;

FIGURE 5a shows a pinched and cut off plastic tube at the moment when it falls on the supporting member which is here in the form of supporting bellows which have not yet been inflated;

FIGURE 5b is a top-plan view of the bellows;

FIGURE 6a shows the supporting bellows of FIG. 5a after the inflation thereof;

FIGURE 6b is a top-plan view of the expanded bellows of FIG. 6a.

Figure 1:
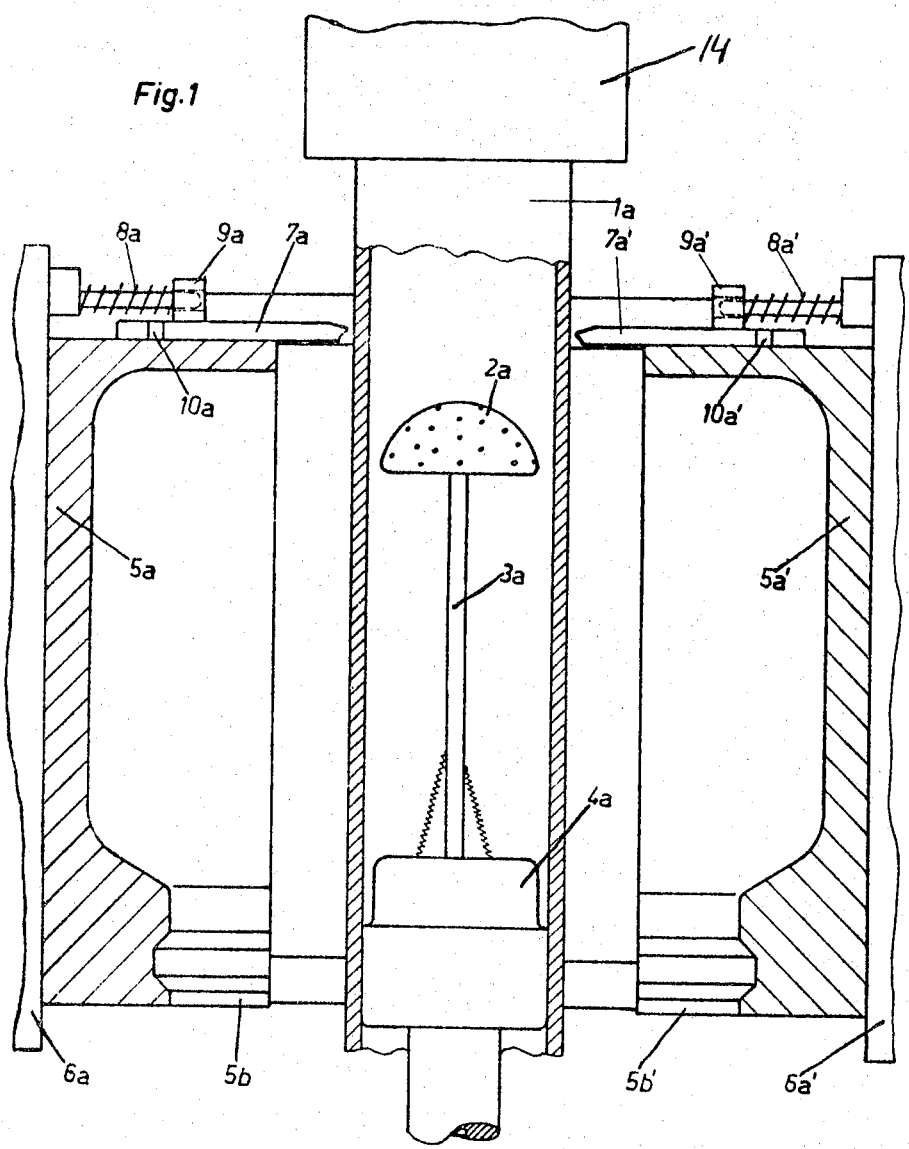
FIGURE 1 is a front view of a tube drawn over a supporting member and a blowing mandrel, the sections of the blow mold being separated.

FIGURE 1 shows plastic tube 1a extruded from an extruder 14, which tube is passed over a supporting disc 2a held in position by a spacer rod 3a and over a blowing mandrel 4a. The supporting disc 2a is preferably made of a heat insulating material so as not to cool the tube unduly. A blow mold having sections 5a and 5a' is positioned in the open condition around the tube 1a with the opening 5b and 5b' of the mold being directed downwards.

Mold slides 7a and 7a' can be pushed towards each other by compression springs 8a and 8a' pressing against bearing blocks 9a and 9a' which are connected to the mold slides 7a and 7a' respectively. The travel of the slides 7a and 7a' is limited by retaining means in the form of stops 10a and 10a'. The mold slides 7a and 7a' could also be operated hydraulically or pneumatically.

FIGURE 2 shows the mold sections or halves 5a and 5a', which are fixed on plates 6a and 6a' respectively, in a partly closed position. In this position of the mold sections the tube 1a is heat-sealed and severed from the remaining tube by the sealing edges 11a, 11a' and cutting edges 12a and 12a' of the slides 7a and 7a'. The severed tube section 1a drops between the open mold sections 5a, 5a' until it rests on top of the supporting disc 2a carried by the spacer rod 3a, the latter being held in a vertical position by tension springs 3d and 3d'. In this position of the tube 1a the severed end of the tube is located a short distance below the top sections 13a, 13a' of the mold. It will be understood that the mold slides 7a and 7a' with their sealing edges 11a and 11a' and their cutting edges 12a and 12a' are pressed against the tube by the pressure of the compression springs 8a and 8a' before the mold is fully closed. In principle it would also be possible to supply the tube 1a from beneath the mold instead of from above the mold. The slides 7a and 7a' would then be positioned below the mold sections 5a and 5a'. However, it would in that case be necessary to provide separate transporting means for moving the severed tube portion 1a upwards to position it between the mold sections 5a and 5a'. It will be seen that such additional transporting means are not necessary if the tube is supplied from above the mold, since the severed tube portion will drop by its own weight between the mold sections until it hangs up on the supporting disc 2a.

In FIGURE 3 the mold has been closed and the plastic tube 1a which was supported by the supporting disc 2a has been formed to a hollow article 1b conforming to the blow mold by the inflation with air supplied through a bore 4b in the blowing mandrel 4a. During this inflation the severed end of the tube 1a is not restrained by the edges of the mold and is therefore free to expand. After the inflation the mold sections 5a, 5a' are separated and the hollow article 1b produced from the blown tube 1a is removed from the mold.

In cross section, the supporting disc 2a shows a number of perforations 2b over its surface, to prevent the blowing air from being supplied through the bore 4b of the blowing mandrel 4a and the interior of the spacer rod 3a from being lifted the supporting disc 2a from the spacer rod 3a, on which the disc 2a is loosely placed.

The lower end of the spacer rod 3a is arranged pivotally in a bearing pedestal 3b of the blowing mandrel 4a by means of a hinge pin 3c. The rod 3a is kept in a vertical position by tension springs 3d and 3d' which cooperate with a stop 3e (FIG. 4) at the lower end of the rod 3a. The pedestal 3b and the tension springs 3d and 3d' are preferably fitted in a recess 4c of the blowing mandrel 4a.

FIGURE 4 is a side view of the mold section 5a', and shows the removal of the hollow article 1b and the tilted position of the spacer rod 3a from which has fallen the supporting disc 2a, which was only loosely placed on top of it. The supporting disc 2a is removed from the blown container 1b and placed on top of the spacer rod 3a after the latter has been returned to the vertical position by the tension springs 3d and 3d' in cooperation with the stop 3e.

The mold slides 7a and 7a' are slightly wider than half the circumference of the extruded plastic tube 1a. The sealing edges 11a and 11a' and the cutting edges 12a and 12a' of the mold slides 7a and 7a' extend across the full width of these slides.

FIGURE 5a shows another embodiment of the supporting member. This figure shows the spacer rod 3a' around which supporting bellows 2d have been arranged.

The bellows 2d are provided with several longitudinally extending grooves 2e which are in communication with the supply of air to the bellows 2d. Initially the bellows 2d are not yet inflated, so that the plastic tube can be easily passed over them. After the tube has passed over the bellows 2d and has been cut off the bellows 2d are inflated by air supplied through the spacer rod 3a' to a shape as shown in FIGURE 6a.

In FIGURE 6a the air conduit through the spacer rod 3a is shown as a bore 3f which is in communication with the interior of the supporting bellows 2d via several perforations 3e in the top section of the rod 3a so that air may be supplied to the interior of the bellows 2d for their inflation and also out of the grooves 2e for the inflation of the tube 1a.

A round supporting disc 3h of solid material is fixed on the upper end of the spacer rod 3a' in order to carry the weight of the severed tube and to support the bellows 2d.

The escape of air through the grooves 2e provides a film of air above the bellows 2d, which lifts the plastic tube 1a immediately from the inflated supporting bellows 2d. After inflation of the tube the air is allowed to flow from the supporting bellows 2d before the blow mold is opened, so that a container having an opening of smaller diameter than the inflated bellows can be drawn over the deflated bellows 2d without difficulty, while the bellows in the inflated condition provide a large supporting area for the tube.

The bellows 2d are preferably made of silicone-rubber.

What is claimed is:

1. An apparatus for producing hollow plastic articles comprising
    a partable blow mold positioned below a plastic tube supplying means said mold including a downwardly directed opening,
    cutting and heat-sealing means for the plastic tube positioned above said blow mold and below the tube supplying means,
    a blowing mandrel extending upwards through the opening of the blow mold in the closed position for inflating the previously sealed tube within the closed mold,
    a supporting member operably connected to the blowing mandrel adapted to extend vertically into the sealed tube to a position a short distance below the inner surface of the upper portion of the closed blow mold for suspending therefrom the sealed tube during inflation of said tube.

2. The apparatus of claim 1 wherein the supporting member is provided with an air conduit for the discharge of air from the supporting member, the air conduit being in communication with the air supply means of the blowing mandrel.

3. The apparatus of claim 1 wherein the top section of the supportnig member is provided with a number of perforations in communication with the air conduit of the supporting member.

4. The apparatus of claim 1 wherein the top of the supporting member is convex-shaped.

5. The apparatus of claim 1 wherein the diameter of the supporting member is not greater than the inside diameter of the plastic tube.

6. The apparatus of claim 1 wherein at least the upper portion of the supporting member is expansible from a diameter not greater than the inside diameter of the tube to a diameter greater than the inside diameter of the tube.

7. The apparatus of claim 1 wherein at least the top of the supporting member is made of a heat insulating material.

8. The apparatus of claim 1 wherein the supporting member comprises a spacer rod positioned on the blowing mandrel and a top section removably mounted on the top of the spacer rod.

9. An apparatus for producing hollow plastic articles comprising a partable blow mold positioned below a plastic tube supplying means, said mold including a downwardly directed opening,
    cutting and heat-sealing means for the plastic tube positioned above said blow mold and below the tube supplying means,
    a blowing mandrel extending upwards through the opening of the blow mold in the closed position for inflating the previously sealed tube within the closed mold,
    a supporting member operably connected to the blowing mandrel adapted to extend vertically into the sealed tube to a position a short distance below the inner surface of the upper portion of the closed blow mold for suspending therefrom the sealed tube during inflation of said tube, the upper portion of said supporting member being formed as an expansible bellows.

References Cited

UNITED STATES PATENTS

| | | | |
|---|---|---|---|
| Re. 25,290 | 12/1962 | Parfrey | 18—5 X |
| 3,162,707 | 12/1964 | Scott et al. | 18—5 X |
| 3,164,646 | 1/1965 | Fischer | 18—5 X |
| 3,278,665 | 10/1966 | Harrison | 18—5 X |

WILBUR L. McBAY, *Primary Examiner.*